Figure 1:
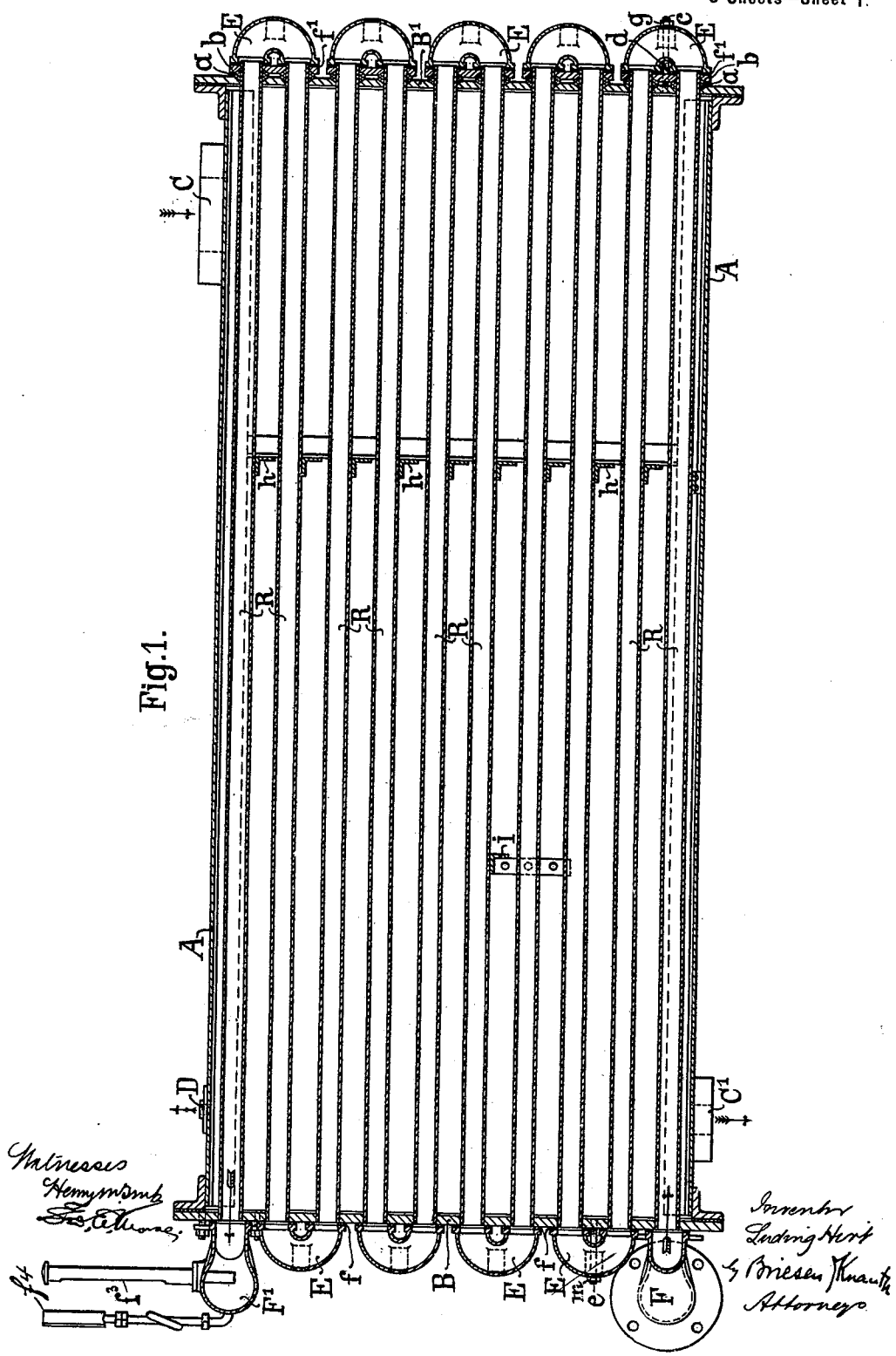

No. 646,050. Patented Mar. 27, 1900.
L. HIRT.
HEATING APPARATUS FOR SUGAR JUICES.
(Application filed May 2, 1899.)
(No Model.) 3 Sheets—Sheet 1.

No. 646,050. Patented Mar. 27, 1900.
L. HIRT.
HEATING APPARATUS FOR SUGAR JUICES.
(Application filed May 2, 1899.)
(No Model.) 3 Sheets—Sheet 2.
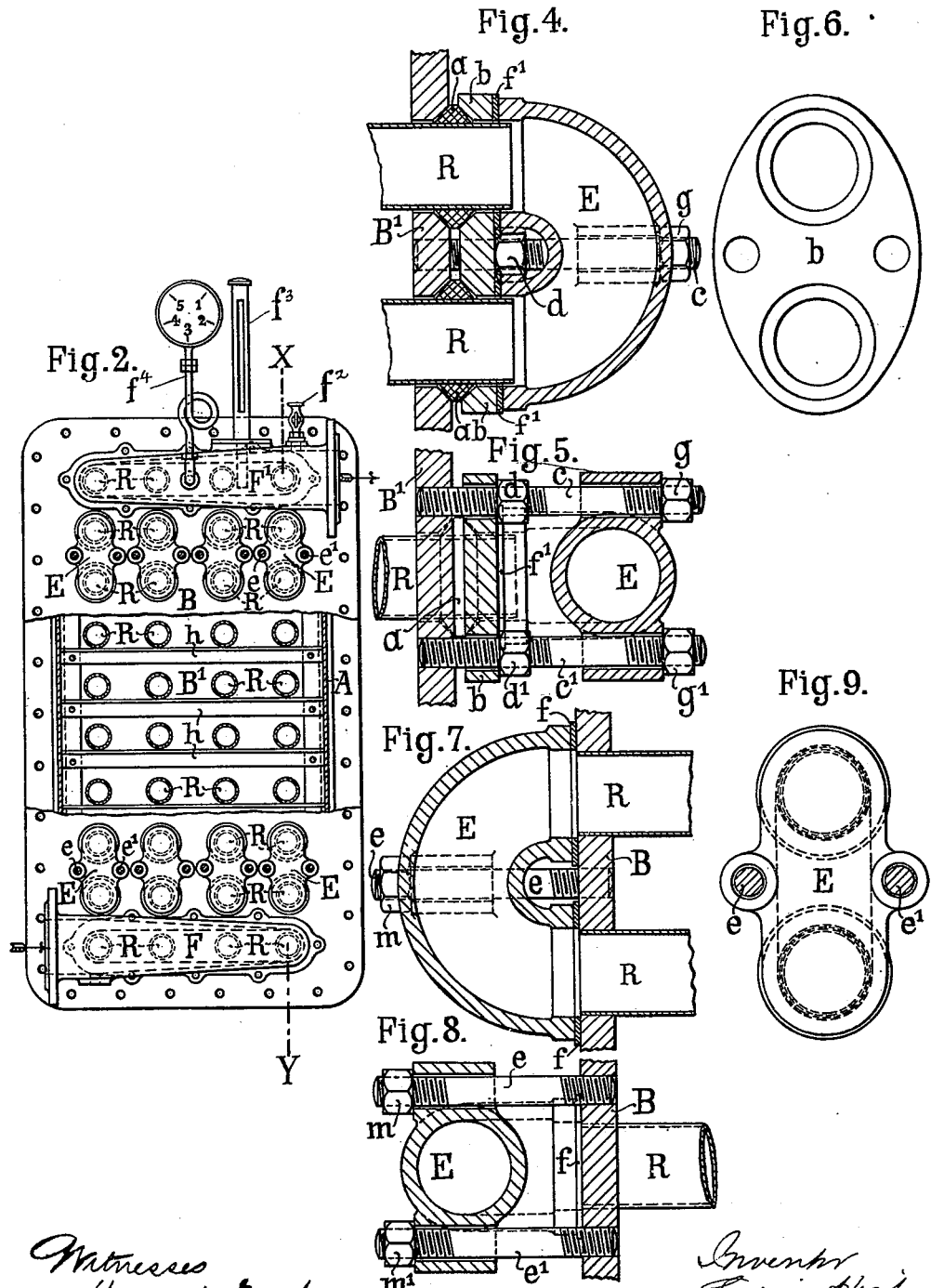

No. 646,050. Patented Mar. 27, 1900.
L. HIRT.
HEATING APPARATUS FOR SUGAR JUICES.
(Application filed May 2, 1899.)
(No Model.) 3 Sheets—Sheet 3.
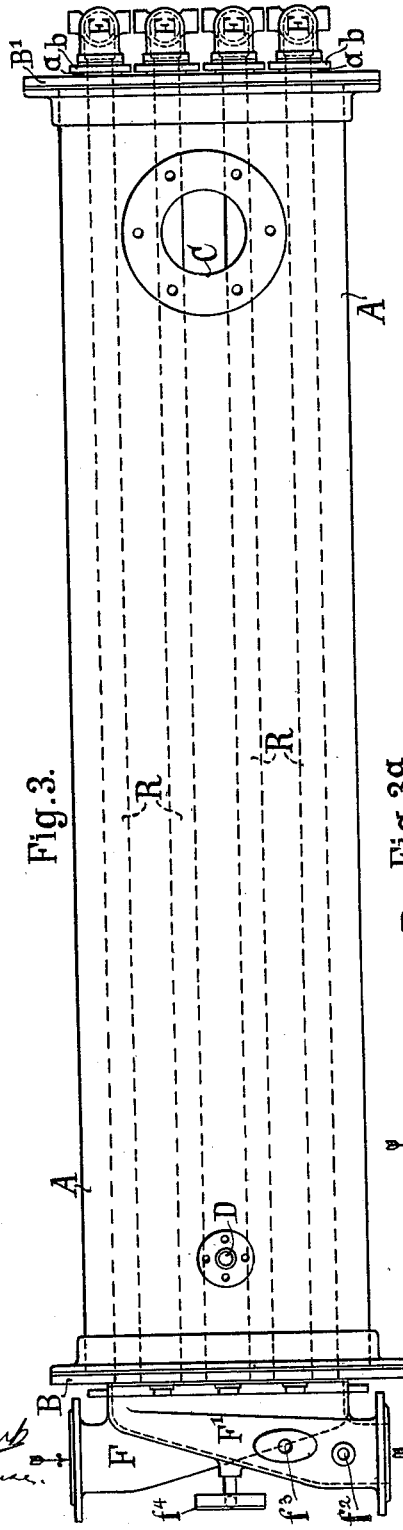
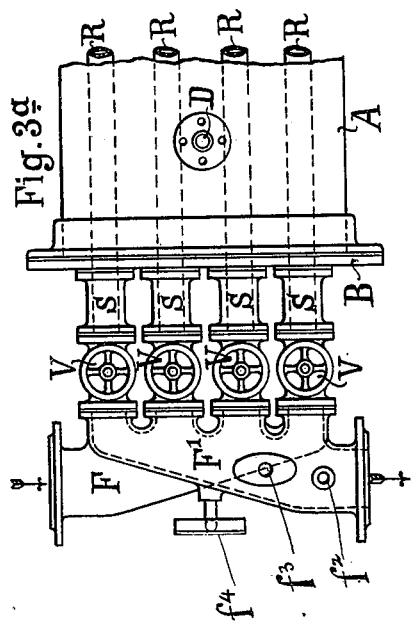

UNITED STATES PATENT OFFICE.

LUDWIG HIRT, OF GREVENBROICH, GERMANY.

HEATING APPARATUS FOR SUGAR JUICES.

SPECIFICATION forming part of Letters Patent No. 646,050, dated March 27, 1900.

Application filed May 2, 1899. Serial No. 715,341. (No model.)

*To all whom it may concern:*

Be it known that I, LUDWIG HIRT, a subject of the Emperor of Austria-Hungary, and a resident of Grevenbroich, Germany, have invented certain new and useful Improvements in Heating Apparatuses for Saccharine Juices and other Liquids, of which the following is a specification.

The herein-described apparatus has for its object to effect the warming of saccharine juices during the manufacture of sugar. By the construction of the said apparatus I obtain, first, the minimizing of the friction of the liquid in the tubes and connections; second, the avoidance of places where sediment can accumulate; third, the construction of the joints of each separate tube in such a manner that the transfer of the liquid from one tube to another takes place in a bend of the same cross-section and form or size as the tube itself, whereby changes in the velocity of the liquid are avoided; fourth, in virtue of this last feature there results a notable increase in the velocity of the saccharine juice to be warmed and in the capacity and duty of the apparatus; fifth, further, on account of the high velocity of the liquid and small amount of friction the sediment cannot readily deposit, and hence the apparatus remains longer in perfect working order; sixth, rapid and easy cleaning of the apparatus even during operation, and, seventh, immunity from the necessity of breaking the packing of the tubes in the tube-plate when the joint between two tubes is broken.

The saccharine liquids to be warmed in the apparatus, according to this invention, may originate from all stages of manufacturing sugar.

The warming of the liquids may be for several purposes. If the liquids are to be subjected to a chemical treatment, the warming is for the purpose of increasing and accelerating the chemical action. This is the case, for instance, in clarifying and saturating saccharine liquids.

If the liquids are to be admitted into the evaporation or vacuum apparatuses, the effect of prewarming the liquids will be this: that the boiling in the apparatuses is not interrupted by the admission of such liquids, which would be the case if these liquids were cooler than the contents of the apparatus. Therefore time is gained by prewarming. If the contents of said apparatuses are to be boiled to grain, the admission or addition of cool liquids would cause the formation of fine grain, which must be avoided.

In warming the liquids in the manner described by means of waste steam a great quantity of heat which otherwise would be lost is utilized. This waste steam is generally not used. If used for prewarming the liquids, it delivers its heat to the liquids, and the steam at the same time is condensed, thus delivering very pure and hot water, suitable for manufacturing purposes and boiler-feeding.

The apparatuses hitherto used for prewarming saccharine liquids have several disadvantages.

In the accompanying drawings the apparatus is shown in Figure 1 in longitudinal section on the line X Y of Fig. 2; in Fig. 2 in end view, partly broken away; and in Fig. 3 in plan. In Figs. 4 to 9, inclusive, details of the tube connections are shown on a larger scale.

This heating apparatus consists of a horizontal casing A, the two ends of which are closed by the tube-plates B B'. In this casing A there are inlet and outlet nozzles C C' for the steam or gas and, when necessary, an outlet D for any gases which may be given off by the heating medium. The steam employed for heating can be properly directed by suitable deflecting-partitions, although this in most cases is unnecessary, as steam always goes toward that place where it can most rapidly condense—that is, where the coldest liquid is. In the tube-plates, which are drilled for the necessary number of tubes R, these latter, which serve for the conveyance of the saccharine juices, are set. The holes in the tube-plate B are cylindrical and those in the tube-plate B' tapering. The tubes are preferably arranged in several rows of four each; but the number of adjacent tubes in a row or set may be greater or less than four. The tubes are passed through the tube-plate B' and expanded in B.

The packing in the tube-plate B' is effected in the following manner: On the tube end, which projects from the plate B', there is placed a rubber ring $a$, which is beveled on each face, and on the rings of two adjoining tubes plates $b$ are laid. The latter, which have tapering apertures for the rings $a$, are placed over two studs $c$ $c'$, fast in the tube-plate B'. (See Fig. 5.) By means of the nuts $d$ $d'$ the plates $b$ are pressed against the rubber rings, and thereby the tubes are packed in the tube-plate B'.

In the connection of pairs of superadjacent tubes bends or elbows $e$ are used. It is important that these bends have the same form and area of internal cross-section as the tubes themselves. They must be internally so smooth that the friction therein is minimized. For this reason they are made of copper or or other easily polished or smoothed material. At the tube-plate B these bends are packed, by means of studs $e$ $e'$, Figs. 7 to 9, with an underlying rubber ring or gasket $f$, and the joint with the tubes is effected by the pressure of the nuts $m$ $m'$; but at the other tube-plate B', Figs. 4 and 5, the rubber rings $f'$ are placed on the tubes themselves and in consequence lie on the plates $b$. The slender bends, the flange of which lies on the rubber rings $f'$ and through which the studs $c$ $c'$ project, are pressed against the rubber rings $f'$ by the nuts $g$ $g'$. There is thus obtained a perfect joint between bend, tube, and plate $b$, and in addition, by tightly screwing up the nuts $g$ $g'$, the nuts $d$ $d'$ can be screwed up more tightly. By fully loosening the nuts $g$ $g'$ the bends can be removed from the tubes to permit cleaning them and that without interfering with the packing of the tubes in the tube-plates.

In the annexed drawings it is assumed that the liquid which is to be warmed flows through adjacent tubes R at the same time and rate, and the inlet and outlet nozzles are constructed on this assumption. The inlet-nozzle F surrounds and serves the lowest row of tubes in the tube-plate B. The liquid goes through these tubes toward the other tube-plate B', passes through the bends (that connect each single tube of the lower row with a single one above it) to the second row, passes backward through these toward the first tube-plate B, and so on until it reaches the outlet-nozzle F', which is similar in construction to the inlet-nozzle F. On this outlet-nozzle F' an air-cock $f^2$, a thermometer $f^3$, and a pressure-gage $f^4$ may be attached.

Naturally the liquid to be warmed could be introduced at the nozzle F' and discharged at the nozzle F.

The tubes are surrounded by the heating medium in the vessel A, which medium after giving up its heat to the tubes and the liquid flowing therein leaves the vessel through the outlet C' with the product of condensation where such exists.

To prevent lateral bending or sagging of the tubes in the interior of this heater, there are supports $h$ $i$ in the containing vessel A.

In Fig. 3ª the arrangement of valves V is shown for closing top and bottom tubes of one vertical set of tubes R in order to exclude liquid therefrom, said valves being located at the upper part of the apparatus between the tube-plate B and the common outlet-header F' and at the lower part between said tube-plate B and the common inlet-header F. In both cases small tube lengths S serve to connect the valves V with the tubes in the casing. By closing its valves any vertical set of tubes may be closed.

When it is desired to clean the uppermost and the lowest series of tubes, the short tube lengths S, after the corresponding valves V have been closed, are removed, so that any impurities removed from the tubes from the side of the tube-plate B' will not enter the valves V.

It is of course assumed that instead of each single set of tubes having its separate inlet-nozzle a group of several may be similarly arranged, so that it can be thrown out of service.

I claim—

1. In a heating device for saccharine juices or other liquid, the combination of a casing A having tube-plates B B' at its ends, horizontal tubes adapted to be heated contained within the said vessel and expanded in one tube-plate B and passing through the other tube-plate B', means for connecting the pairs of superadjacent tubes outside of the casing comprising bends or elbows of the same form and size or cross-section as the tubes and means for packing the tubes in the tube-plate B' consisting of an elastic ring for each tube, plates $b$ resting upon the said rings, studs $c$ $c'$ passing through the said plates, nuts $d$ threaded upon the studs and serving to hold the plates $b$ in place and nuts $g$ $g'$ likewise threaded on the said studs and serving to hold the bends or elbows in place, substantially as described and for the purposes set forth.

2. A heating apparatus for saccharine juice or other liquid consisting of a casing A, tubes R having removable joints and passing therethrough arranged in rows and adapted to be heated from the interior of the vessel, all the tubes of each row being connected in series, a header connecting the inlet ends of all of the rows of tubes R for simultaneous admission of the liquid and a header connecting the outlet ends of all the rows of tubes R for the simultaneous escape of said liquid the said headers being provided with valves for shunting or entirely cutting out one or more rows of superposed tubes from connection with the said headers for admission and escape of the fluid to be heated.

In testimony that I claim the foregoing as my invention I have signed my name, in presence of two witnesses, this 21st day of April, 1899.

LUDWIG HIRT.

Witnesses:
 WILLIAM ESSENWEIN,
 GEO. P. PETTIT.